(12) United States Patent
Aoki et al.

(10) Patent No.: US 11,225,034 B2
(45) Date of Patent: Jan. 18, 2022

(54) PRODUCTION METHOD OF COMPOSITE MATERIAL

(71) Applicant: SUBARU CORPORATION, Tokyo (JP)

(72) Inventors: Kazuyuki Aoki, Tokyo (JP); Yamato Tsukazaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 104 days.

(21) Appl. No.: 16/721,524

(22) Filed: Dec. 19, 2019

(65) Prior Publication Data
US 2020/0238633 A1 Jul. 30, 2020

(30) Foreign Application Priority Data

Jan. 29, 2019 (JP) .............................. JP2019-012789

(51) Int. Cl.
*B29C 70/08* (2006.01)
*B29K 105/08* (2006.01)
*C08J 5/04* (2006.01)

(52) U.S. Cl.
CPC ...... *B29C 70/08* (2013.01); *B29K 2105/0872* (2013.01); *C08J 5/042* (2013.01); *C08J 5/043* (2013.01)

(58) Field of Classification Search
CPC .................................................... B29C 70/08
See application file for complete search history.

(56) References Cited

U.S. PATENT DOCUMENTS

| 6,638,466 B1 | 10/2003 | Abbott |
| 2013/0139961 A1 | 6/2013 | Gear et al. |
| 2015/0203186 A1* | 7/2015 | Lunney ................. B29C 65/564 428/120 |

FOREIGN PATENT DOCUMENTS

| EP | 3 653 371 A1 | 5/2020 |
| JP | 2018-172474 A | 11/2018 |

OTHER PUBLICATIONS

Extended European Search Report dated Jun. 25, 2020 for European Patent Application No. 20154246.1-1017.

\* cited by examiner

*Primary Examiner* — Galen H Hauth
(74) *Attorney, Agent, or Firm* — McGinn I.P. Law Group, PLLC.

(57) ABSTRACT

A production method of a composite material includes placing a fiber base material on a mold. The fiber base material includes a first fiber base material portion and a second fiber base material portion. The method further includes disposing a mold release member in part of a region where the first fiber base material portion and the second fiber base material portion are in contact with each other, and curing a resin with which the first fiber base material portion and the second fiber base material portion are impregnated, so as to mold the composite material.

10 Claims, 6 Drawing Sheets

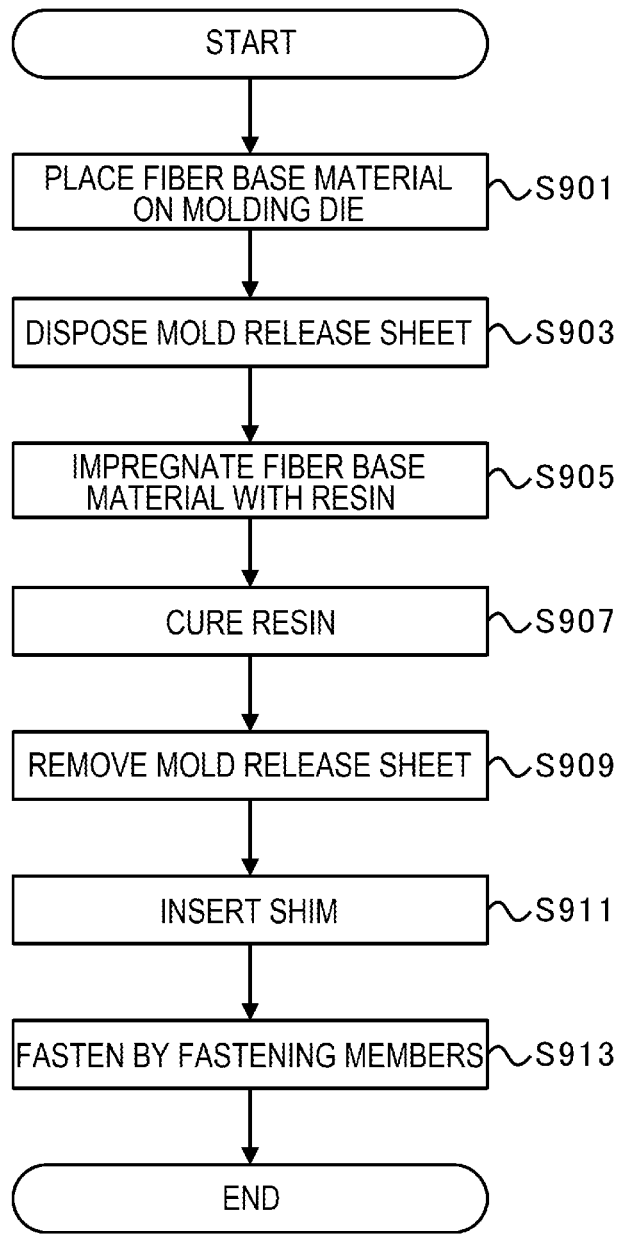

PRODUCTION METHOD OF COMPOSITE MATERIAL

CROSS-REFERENCE TO RELATED APPLICATIONS

The present application claims priority from Japanese Patent Application No. 2019-012789 filed on Jan. 29, 2019, the entire contents of which are hereby incorporated by reference.

BACKGROUND

The disclosure relates to a production method of a composite material.

Japanese Unexamined Patent Application Publication No. 2018-172474 discloses molding a composite material by placing, on a mold, a fiber base material including a first fiber base material portion and a second fiber base material portion, and heating and curing a resin with which the first fiber base material portion and the second fiber base material portion are impregnated.

SUMMARY

An aspect of the disclosure provides a production method of a composite material. The method includes: placing, on a mold, including a first fiber base material portion and a second fiber base material portion; disposing a mold release member in part of a region where the first fiber base material portion and the second fiber base material portion are in contact with each other; and curing a resin with which the first fiber base material portion and the second fiber base material portion are impregnated, so as to mold the composite material.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 9 is a flowchart illustrating a production method of the composite material according to the embodiment.

DETAILED DESCRIPTION

When heated to cure, a resin sets and contracts. The heated and set resin undergoes thermal contraction on cooling. After molding a composite material, a first fiber base material portion is coupled to a second fiber base material portion with the resin. Consequently, when a contraction factor of the resin in the first fiber base material portion is different from a contraction factor of the resin in the second fiber base material portion, the composite material may unintentionally deform. In this respect, there is still room for improvement.

It is desirable to provide a production method of a composite material that makes it possible to prevent the composite material from deforming.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
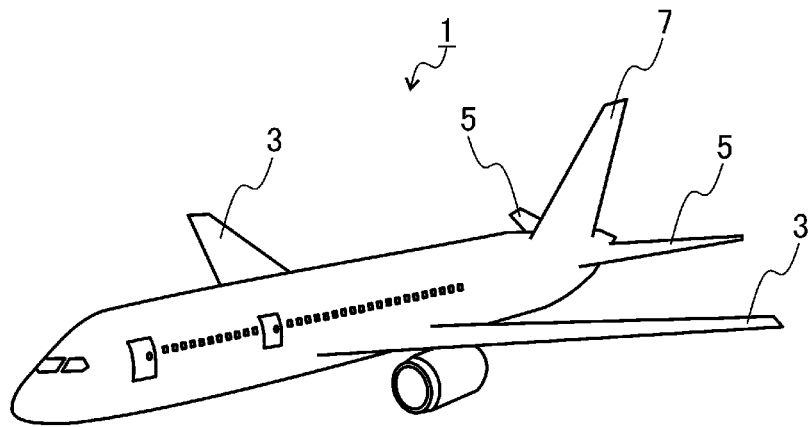
FIG. 1 is a schematic perspective view of an aircraft.
Figure 2:
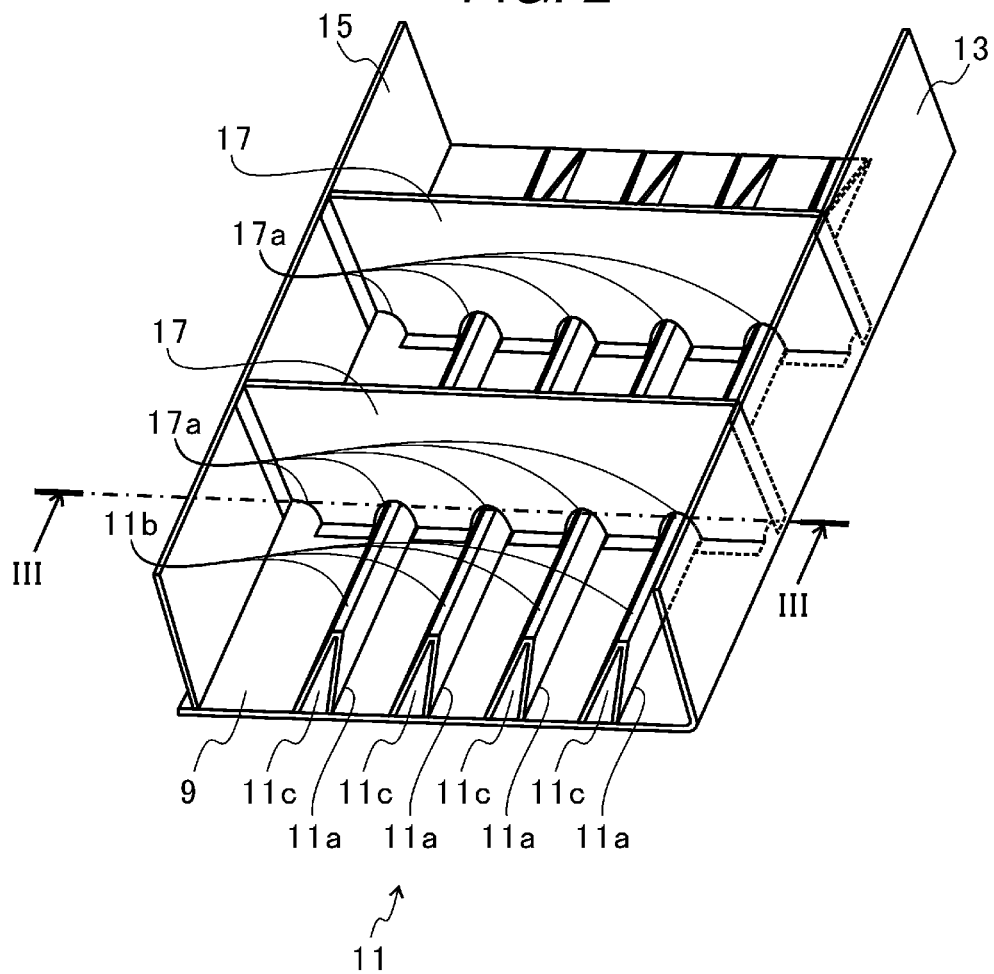
FIG. 2 is a schematic perspective view of part of a wing of the aircraft.

FIG. 1 is a schematic perspective view of an aircraft 1. As illustrated in FIG. 1, the aircraft 1 includes main wings 3, horizontal stabilizers 5, and a vertical stabilizer 7. Hereinafter, the main wings 3, the horizontal stabilizers 5, and the vertical stabilizer 7 will be simply referred to as wings. FIG. 2 is a schematic perspective view of part of a wing of the aircraft 1. As illustrated in FIG. 2, the wing of the aircraft 1 includes a skin 9, stringers 11, a front wing spar 13, a rear wing spar 15, and ribs 17.

The skin 9 is an outer shell of the wing of the aircraft 1. The skin 9 has, for example, a flat plate shape. The skin 9 extends in a longitudinal direction of the wing. The stringers 11 are used as reinforcement materials that reinforce the skin 9, and are attached to a region of the skin 9 inside the wing. The stringers 11 extend in the longitudinal direction of the wing. Each stringer 11 includes a coupling portion 11a coupled to the skin 9 and a protrusion 11b that protrudes away from the skin 9.

A hollow portion 11c is formed between the protrusion 11b and the skin 9. Examples of the stringer 11 include a hat stringer having a hat shape and a corrugated stringer having a corrugated shape. FIG. 2 illustrates an example in which the stringers 11 are the corrugated stringers. The stringers 11 are not limited thereto. Alternatively, the stringers 11 may be the hat stringers.

The front wing spar 13 stands at a substantially right angle relative to the skin 9. The front wing spar 13 is located inside the wing and supports a front edge of the wing. The front wing spar 13 has, for example, a flat plate shape. The front wing spar 13 extends in the longitudinal direction of the wing.

The rear wing spar 15 stands at a substantially right angle relative to the skin 9. The rear wing spar 15 is located inside the wing and supports a rear edge of the wing. The rear wing spar 15 has, for example, a flat plate shape. The rear wing spar 15 extends in the longitudinal direction of the wing.

The ribs 17 stand at a substantially right angle relative to the skin 9. The ribs 17 are located inside the wing and support the front wing spar 13 and the rear wing spar 15.

Each rib 17 has, for example, a flat plate shape. The ribs 17 are perpendicular to the longitudinal direction of the wing. Consequently, the ribs 17 are disposed perpendicularly to the direction in which the stringers 11, the front wing spar 13, and the rear wing spar 15 extend.

Figure 3:
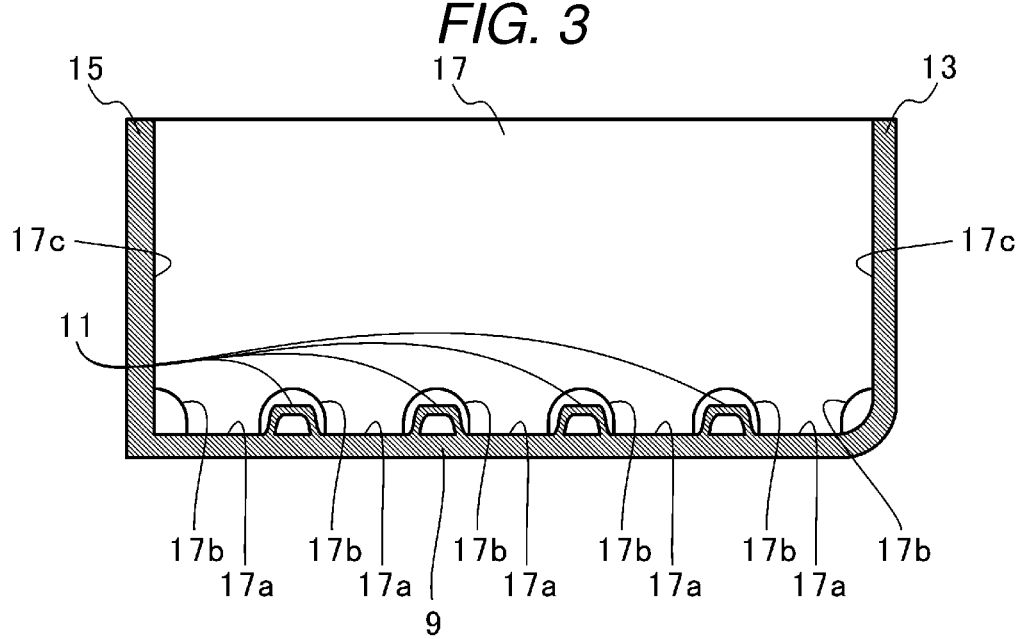
FIG. 3 is a schematic longitudinal sectional view of part of the wing of the aircraft.

FIG. 3 is a schematic sectional view of part of the wing of the aircraft 1 taken along a line III-III in FIG. 2. As illustrated in FIG. 3, plural notches 17b are formed in a lower end 17a of each rib 17. The notches 17b are opposed to the stringers 11. The lower ends 17a of the rib 17 are coupled to (in contact with) the skin 9 but not coupled to (in non-contact with) the stringers 11. Side ends 17c of the rib 17 are coupled to the front wing spar 13 and the rear wing spar 15 to join the front wing spar 13 and the rear wing spar 15.

The skin 9, the stringers 11, the front wing spar 13, the rear wing spar 15, and the ribs 17 are made of a composite material. In the embodiment, examples of the composite material include glass fiber reinforced plastics (GFRP) and carbon fiber reinforced plastics (CFRP). The composite material is molded by a composite material molding device 100 described below.

Figure 4:
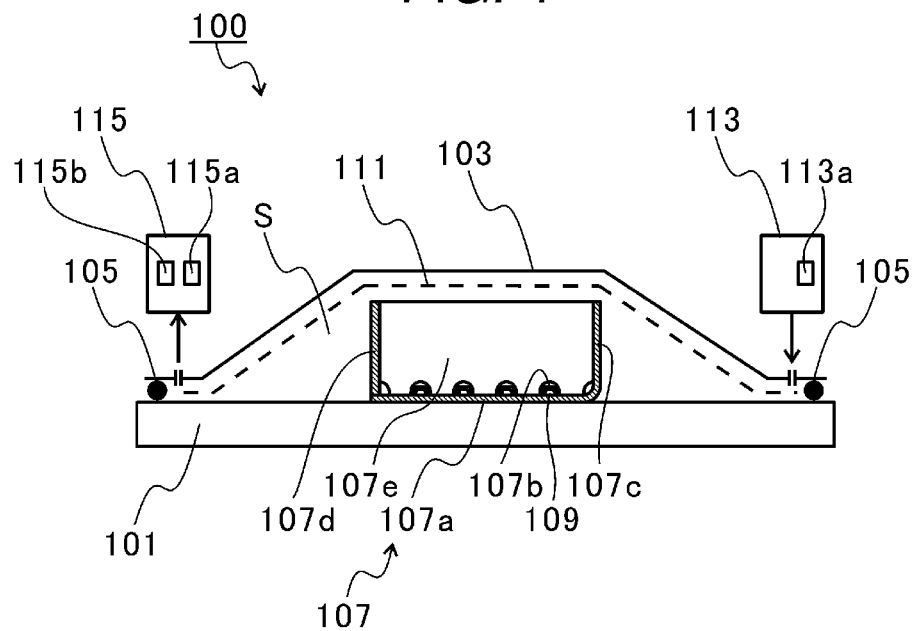
FIG. 4 is a diagram illustrating a composite material molding device according to an embodiment.

FIG. 4 is a diagram illustrating the composite material molding device 100 according to the embodiment. The composite material molding device 100 molds the composite material by a vacuum assisted resin transfer molding (VaRTM) technique. As illustrated in FIG. 4, the composite material molding device 100 includes a molding die 101, a film material 103, seal members 105, a fiber base material 107, jigs 109, resin distribution media 111, a resin supply unit 113, and a resin discharge unit 115. In one embodiment, the molding die 101 may serve as a "mold".

A space S is formed between the molding die 101 and the film material 103. The space S is sealed by the seal members 105 disposed between the molding die 101 and the film material 103. The fiber base material 107 and the resin distribution media 111 are disposed in the space S.

The fiber base material 107 is placed on the molding die 101. The fiber base material 107 is formed by stacking fiber materials such as glass fibers or carbon fibers. It is noted that the fiber base material 107 may be a prepreg including a fiber material impregnated with a resin.

The fiber base material 107 includes a fiber base material portion 107a corresponding to the skin 9 (hereinafter referred to as skin material portion 107a), fiber base material portions 107b corresponding to the stringers 11 (hereinafter referred to as stringer material portions 107b), a fiber base material portion 107c corresponding to the front wing spar 13 (hereinafter referred to as front-wing-spar material portion 107c), a fiber base material portion 107d corresponding to the rear wing spar 15 (hereinafter referred to as rear-wing-spar material portion 107d), and fiber base material portions 107e corresponding to the ribs 17 (hereinafter referred to as rib material portions 107e). In one embodiment, the rib material portions 107e may serve as "first fiber base material portions", and the skin material portion 107a, the front-wing-spar material portion 107c, and the rear-wing-spar material portion 107d may serve as a "second fiber base material portion".

In the embodiment, the skin material portion 107a is permanently affixed to the front-wing-spar material portion 107c. The skin material portion 107a and the front-wing-spar material portion 107c are placed on the molding die 101. The stringer material portions 107b, the rear-wing-spar material portion 107d, and the rib material portions 107e are placed on the skin material portion 107a. However, the disclosure is not limited thereto. Alternatively, the skin material portion 107a may be formed separately from the front-wing-spar material portion 107c.

The jigs 109 are disposed between the skin material portion 107a and the stringer material portions 107b. The jigs 109 have an outer shape approximate to the outer shape of the hollow portions 11c (see FIG. 2) formed between the skin 9 and the protrusions 11b of the stringers 11. The jigs 109 retain the shape of the protrusions 11b (see FIG. 2) after the stringers 11 are molded. The outer shape of the jigs 109 is substantially identical with an inner surface shape of the protrusions 11b of the stringers 11.

The jigs 109 extend in a depth direction in FIG. 4 (that is, a direction perpendicular to the plane of the paper of FIG. 4). The jigs 109 are placed on the skin material portion 107a, and the stringer material portions 107b are placed on the jigs 109. That is, the jigs 109 are disposed between the skin material portion 107a and the stringer material portions 107b.

The resin distribution media 111 is placed on the fiber base material 107. For example, a polyethylene net is used as the resin distribution media 111. Supplied resin is uniformly distributed in the space S via the resin distribution media 111.

The resin supply unit 113 and the resin discharge unit 115 are coupled to the space S sealed by the seal members 105. The resin supply unit 113 includes a resin supply tank 113a that stores the resin. The resin supply unit 113 supplies the resin stored in the resin supply tank 113a into the space S.

The resin discharge unit 115 includes a vacuum pump 115a that suctions air and evacuates the space S, and a resin discharge tank 115b that stores the resin. The vacuum pump 115a suctions the air and resin in the space S. The resin discharge tank 115b stores (collects) the resin (that is, surplus resin) suctioned from the space S.

In the embodiment, the resin is thermosetting resin. The disclosure is not limited thereto. Alternatively, the resin may be, for example, thermoplastic resin. When the resin is supplied into the space S, the resin flows from the resin supply unit 113 side (right side in FIG. 4) toward the resin discharge unit 115 side (left side in FIG. 4). The plural jigs 109 are arranged along a flowing direction of the resin (hereinafter referred to as resin flowing direction). A longitudinal direction (that is, an extending direction) of the jigs 109 intersects the resin flowing direction. The longitudinal direction of the jigs 109 may be orthogonal to the resin flowing direction. The disclosure is not limited thereto. Alternatively, the longitudinal direction of the jigs 109 may be parallel to the resin flowing direction.

Next, a production method of the composite material using the composite material molding device 100 will be described. First, a user places the fiber base material 107 and the jigs 109 on the molding die 101.

Next, the user covers the fiber base material 107 with the resin distribution media 111 and the film material 103, and disposes the seal members 105 between the film material 103 and the molding die 101 so as to enclose the fiber base material 107. Accordingly, the sealed space S is formed between the film material 103 and the molding die 101, and the resin distribution media 111, the fiber base material 107, and the jigs 109 are accommodated in the space S.

Thereafter, the user couples the resin supply unit 113 and the resin discharge unit 115 to the space S. When the resin supply unit 113 and the resin discharge unit 115 are coupled to the space S, the resin discharge unit 115 drives the vacuum pump 115a. The vacuum pump 115a suctions air in the space S to evacuate the space S. When the space S is in the vacuum state, the resin supply unit 113 supplies the resin stored in the resin supply tank 113a into the space S.

The resin supplied into the space S is distributed via the resin distribution media 111 throughout the fiber base material 107. The fiber base material 107 is impregnated with the resin distributed via the resin distribution media 111. A surplus of the resin with which the fiber base material 107 is impregnated is discharged into the resin discharge tank 115b of the resin discharge unit 115.

When the fiber base material 107 is impregnated with the resin, the composite material molding device 100 causes a heating device (not illustrated) to heat the resin. The resin is cured when heated by the heating device (not illustrated). Portions of the composite material (corresponding to the skin 9, the stringers 11, the front wing spar 13, the rear wing spar 15, and the ribs 17) are integrally molded by curing the resin. That is, the molded composite material portions (the skin 9, the stringers 11, the front wing spar 13, the rear wing spar 15, and the ribs 17) are permanently affixed to each other.

After the composite material is molded, the jigs 109 are pulled out from between the skin 9 and the stringers 11. Accordingly, as illustrated in FIG. 2, the hollow portions 11c are formed between the skin 9 and the protrusions 1ib of the stringers 11.

In this manner, the composite material is molded by heating and curing the resin. However, when heated to cure, the resin sets and contracts. The heated and set resin undergoes thermal contraction on cooling. After the composite material is molded, for example, the resin makes the rib material portions 107e coupled to the front-wing-spar material portion 107c and the rear-wing-spar material portion 107d. Consequently, when a contraction factor of the resin in the rib material portions 107e is different from contraction factors of the resin in the front-wing-spar material portion 107c and the rear-wing-spar material portion 107d, the composite material may unintentionally deform. In this respect, there is still room for improvement.

Figure 5A:
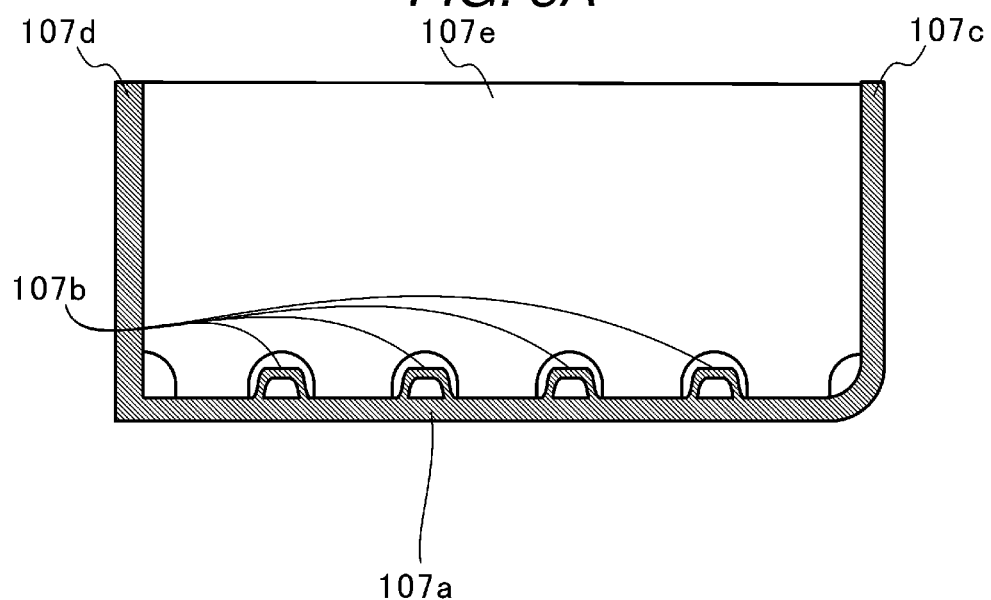
FIGS. 5A and 5B are diagrams illustrating unintentional deformation of a composite material in related art.
Figure 5B:
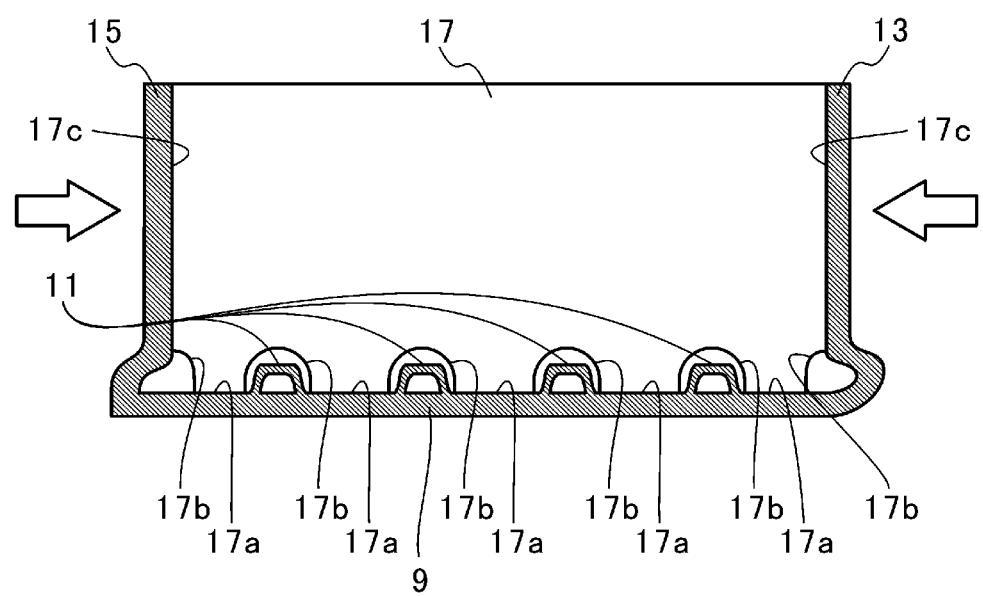

FIGS. 5A and 5B are diagrams illustrating unintentional deformation of a composite material in related art. FIG. 5A illustrates the composite material in the related art before molding (that is, before the resin is cured), and FIG. 5B illustrates the composite material in the related art after molding (that is, after the resin is cured). As illustrated in FIG. 5B, as a result of curing contraction and thermal contraction of the resin, the ribs 17 contract (deform) in directions indicated with arrows in FIG. 5B. Thus, the front wing spar 13 and the rear wing spar 15 coupled to the side ends 17c of the ribs 17 with the resin deform along with the ribs 17 in the directions indicated with the arrows in FIG. 5B by contraction amounts (deformation amounts) of the ribs 17.

In this case, initial stress is exerted on coupling portions between the front wing spar 13 (the rear wing spar 15) and the ribs 17, thereby decreasing the composite material in strength. In view of this, in the embodiment, the fiber base material 107 includes a mold release sheet 19 disposed in at least one of (i) a position between the rib material portions 107e and the front-wing-spar material portion 107c or (ii) a position between the rib material portions 107e and the rear-wing-spar material portion 107d. In one embodiment, the mold release sheet 19 may serve as a "mold release member".

Figure 6:
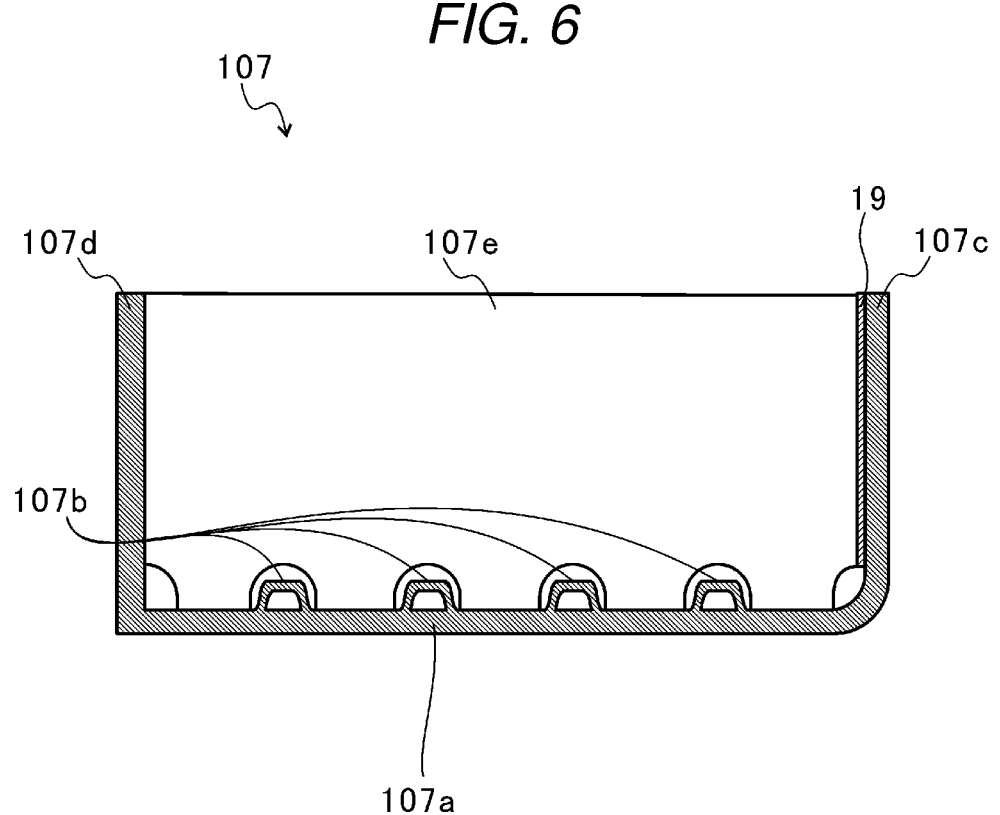
FIG. 6 is a diagram illustrating the structure of a fiber base material according to the embodiment.

FIG. 6 is a diagram illustrating the structure of the fiber base material 107 according to the embodiment. As illustrated in FIG. 6, the fiber base material 107 according to the embodiment includes the mold release sheet 19. The mold release sheet 19 is disposed in part of a region where the rib material portions 107e are in contact with the skin material portion 107a, the front-wing-spar material portion 107c, and the rear-wing-spar material portion 107d. In the embodiment, the mold release sheet 19 is simply interposed between the rib material portions 107e and the front-wing-spar material portion 107c. Since the mold release sheet 19 is interposed between the rib material portions 107e and the front-wing-spar material portion 107c, the rib material portions 107e are in non-contact with the front-wing-spar material portion 107c. After disposing the mold release sheet 19, the composite material molding device 100 (see FIG. 4) is used in the above-described manner to impregnate the fiber base material 107 with the resin and cure the resin.

Figure 7:
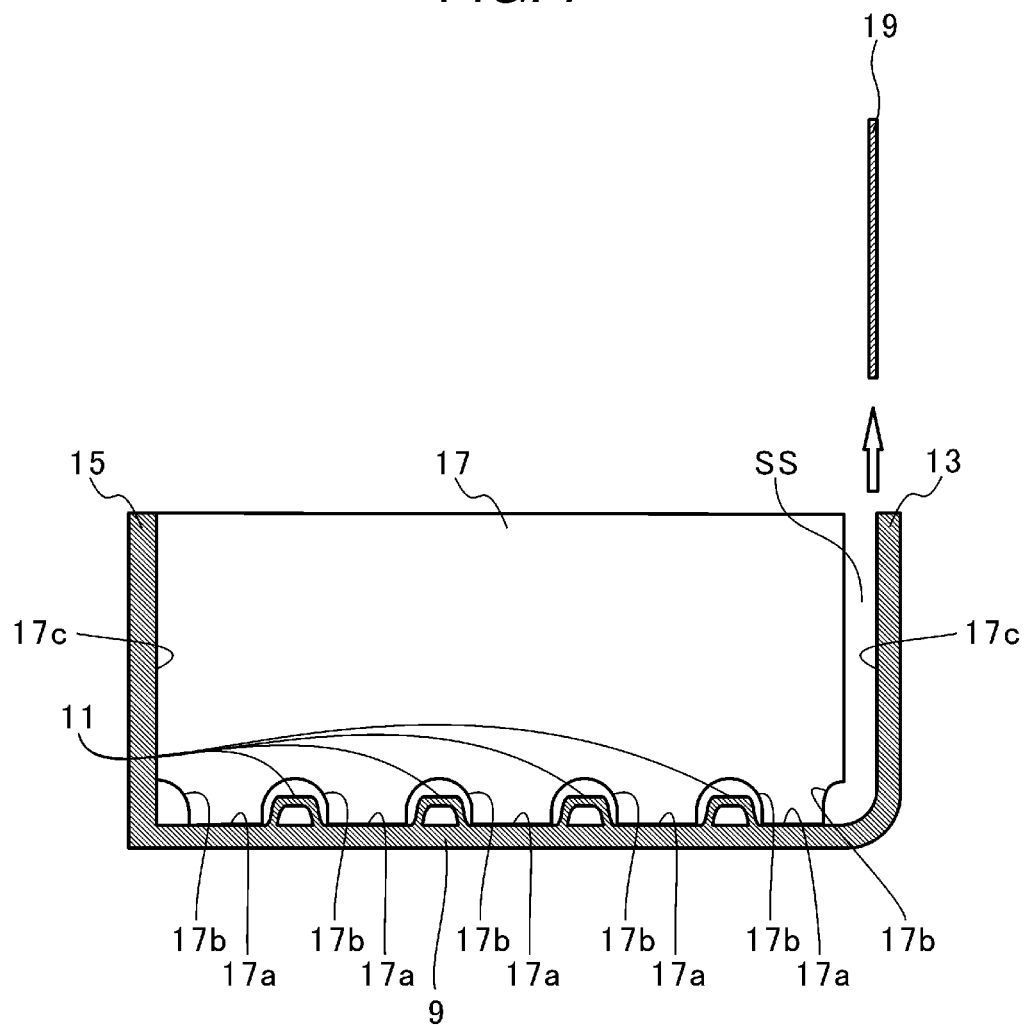
FIG. 7 is a diagram illustrating the fiber base material according to the embodiment after a resin is cured.

FIG. 7 is a diagram illustrating the fiber base material 107 according to the embodiment after the resin is cured. As illustrated in FIG. 7, when the mold release sheet 19 is removed from the composite material after the resin is cured, a gap SS is formed between the ribs 17 and the front wing spar 13. In one embodiment, the gap may serve as "space". The reason is that the ribs 17 contract (deform) in a direction away from the front wing spar 13 owing to curing contraction and thermal contraction of the resin. As described above, the mold release sheet 19 causes the front-wing-spar material portion 107c to be in non-contact with the rib material portions 107e, so that the front-wing-spar material portion 107c can maintain the disposed position irrespective of deformation of the ribs 17. Thus, the ribs 17 are not coupled to the front wing spar 13. That is, the ribs 17 are apart from the front wing spar 13.

Consequently, no initial stress is exerted between the ribs 17 and the front wing spar 13. Since the ribs 17 are in non-contact with the front wing spar 13, initial stress exerted between the ribs 17 and the rear wing spar 15 (exerted on portions where the ribs 17 and the rear wing spar 15 are coupled to each other) is decreased. In this manner, in the embodiment, the ribs 17 are not coupled to the front wing spar 13 to prevent deformation of the composite material.

In this case, however, the front wing spar 13 is not coupled to the ribs 17 and not supported by the ribs 17 in consequence. This may decrease the composite material in strength. Therefore, in the embodiment, a shim 21 is disposed in the gap SS between the front wing spar 13 and the ribs 17. Furthermore, the front wing spar 13 and the ribs 17 are fastened by fastening members 23, with the shim 21 interposed between the front wing spar 13 and the ribs 17.

Figure 8:
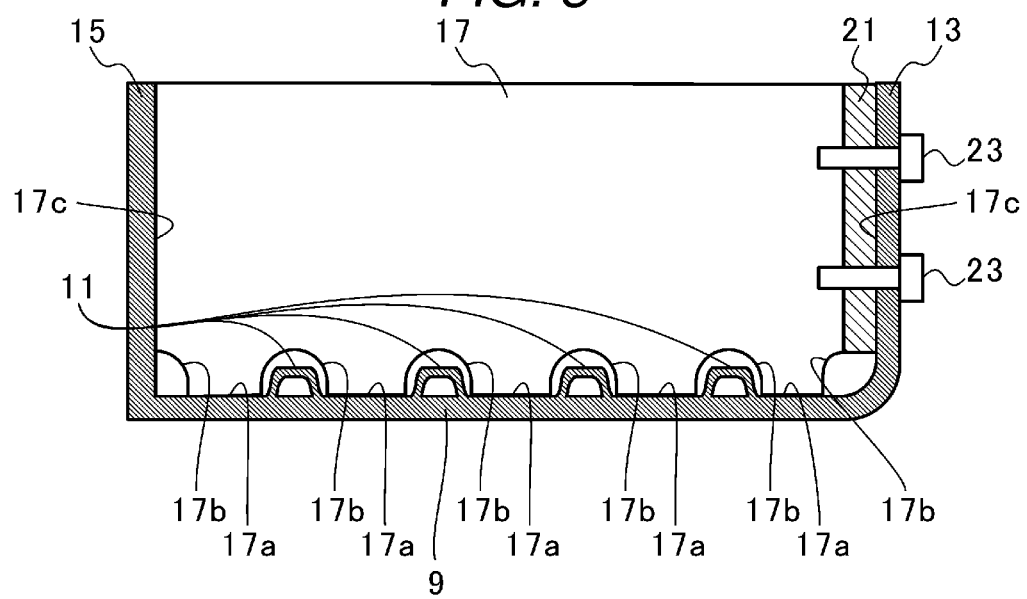
FIG. 8 is a diagram illustrating a front wing spar and ribs that are fastened by fastening members, with a shim interposed between the front wing spar and the ribs.

FIG. 8 is a diagram illustrating the front wing spar 13 and the ribs 17 that are fastened by the fastening members 23, with the shim 21 interposed between the front wing spar 13 and the ribs 17. As illustrated in FIG. 8, the shim 21 is disposed in the gap SS (see FIG. 7) between the front wing spar 13 and the ribs 17. The shim 21 has substantially the same shape as the gap SS between the front wing spar 13 and the ribs 17. The fastening members 23 fasten the front wing spar 13 and the ribs 17 to each other with the shim 21 disposed in between. Thus, the front wing spar 13 is fastened to the ribs 17 with the shim 21 interposed between the front wing spar 13 and the ribs 17 so as to reinforce the composite material in strength.

FIG. 9 is a flowchart illustrating a production method of the composite material according to the embodiment. In the production method of the composite material according to the embodiment, as illustrated in FIG. 4, the fiber base material 107 is first placed on the molding die 101 (step S901).

Next, as illustrated in FIG. 6, the mold release sheet 19 is disposed between the rib material portions 107e and the front-wing-spar material portion 107*c* (step S903). Then, the fiber base material 107 provided with the mold release sheet 19 is impregnated with the resin (step S905).

Thereafter, the resin with which the fiber base material 107 is impregnated is cured to mold the composite material (step S907). After molding the composite material, as illustrated in FIG. 7, the mold release sheet 19 is removed from the composite material (step S909). For example, the mold release sheet 19 is removed from between the front wing spar 13 and the ribs 17.

After removing the mold release sheet 19, as illustrated in FIG. 8, the shim 21 is inserted into the gap between the ribs 17 and the front wing spar 13, from which the mold release sheet 19 has been removed (step S911). After inserting the shim 21, the composite material and the shim 21 are fastened by the fastening members 23 (step S913). For example, the front wing spar 13 and the ribs 17 are fastened by the fastening members 23.

As described above, according to the embodiment, the mold release sheet 19 is disposed in part of the region where the rib material portions 107*e* is in contact with the skin material portion 107*a*, the front-wing-spar material portion 107*c*, and the rear-wing-spar material portion 107*d*. Thus, (i) the rib material portions 107*e* and (ii) the skin material portion 107*a*, the front-wing-spar material portion 107*c*, and the rear-wing-spar material portion 107*d* can be permanently affixed to each other, and at the same time, the composite material can be prevented from deforming. The shim 21 is inserted in the gap from which the mold release sheet 19 has been removed, and the composite material and the shim 21 are fastened by the fastening members 23 so as to prevent the composite material from decreasing in strength.

The embodiment of the disclosure has been described above with reference to the accompanying drawings. It is needless to say that the present disclosure is not limited to such an embodiment. It will be apparent to those skilled in the art that various changes and modifications to the embodiment can be conceived within the scope of the appended claims, and it is to be understood that such changes and modifications also belong to the technical scope of the disclosure.

A possible example of the disclosure may also provide a program that causes a computer to implement the production method of the composite material illustrated in FIG. 9, and a storage medium such as a computer readable flexible disc, a magneto-optical disc, a ROM, a CD, a DVD, or a BD that stores the program. Here, the program refers to a data processing application described in any language or description method.

In the above embodiment, the mold release sheet 19 is interposed between the rib material portions 107*e* and the front-wing-spar material portion 107*c*. However, this is not to be construed in a limiting sense. The mold release sheet 19 may be interposed between the rib material portions 107*e* and the rear-wing-spar material portion 107*d*. Alternatively, the mold release sheet 19 may be interposed both between the rib material portions 107*e* and the front-wing-spar material portion 107*c* and between the rib material portions 107*e* and the rear-wing-spar material portion 107*d*. In any case, the mold release sheet 19 may be simply disposed in a region except for at least part of a region between the rib material portions 107*e* and the skin material portion 107*a* so as to permanently affix the ribs 17 and the skin 9 with the resin.

In the above embodiment, the shim 21 is inserted in the gap SS between the ribs 17 and the front wing spar 13, and the ribs 17 and the front wing spar 13 are fastened by the fastening members 23. However, this is not to be construed in a limiting sense. An additional fiber base material (hereinafter referred to as gap material portion) may be disposed in the gap SS between the ribs 17 and the front wing spar 13, and the gap material portion may be impregnated with the resin to cure the resin and couple the ribs 17 and the front wing spar 13 to each other.

According to the embodiment of the disclosure, deformation of the composite material can be prevented.

The invention claimed is:

1. A production method of a composite material, the method comprising:
   placing a fiber base material on a mold, the fiber base material comprising a first fiber base material portion and a second fiber base material portion;
   disposing a mold release member between the first fiber base material portion and the second fiber base material portion; and
   curing a resin with which the first fiber base material portion and the second fiber base material portion are impregnated, so as to mold the composite material, wherein
   the first fiber base material portion includes a rib material portion corresponding to a rib of a wing of an aircraft, and having a first side end and a second side end opposite to the first side end,
   the second fiber base material portion includes a front-wing-spar material portion corresponding to a front wing spar of the wing, and a rear-wing-spar material portion corresponding to a rear wing spar of the wing,
   in the placing the fiber base material on the mold, the rib material portion is placed so that: the first side end is adjacent to the front-wing-spar material portion; the second side end is adjacent to the rear-wing-spar material portion; and at least apart of the rib material portion contacts with the second fiber base material portion, and
   in the curing the resin, the resin is cured in a state where the mold release member is disposed in at least one of: a first position between the first side end and the front-wing-spar material portion; and a second position between the second side end and the rear-wing-spar material portion.

2. The production method according to claim 1, further comprising:
   removing the mold release member, after the molding the composite material;
   inserting a shim in a space from which the mold release member has been removed, after the removing the mold release member; and
   fastening the composite material and the shim by a fastening member, after the inserting the shim.

3. The production method according to claim 1, wherein in the curing the resin,
   the resin is cured in a state where the mold release member is disposed in one of the first position and the second position, and
   the rib material portion contacts with the front-wing-spar material portion or the rear-wing-spar material portion in the other of the first position and the second position.

4. The production method according to claim 1, further comprising impregnating the fiber base material with the resin, after the disposing the mold release member and before the curing the resin.

5. The production method according to claim 1, wherein the mold release member comprises a mold release sheet member, and
   in the curing the resin, the resin is cured in a state where the mold release sheet member is disposed in one of the first position and the second position, and the rib material portion contacts the second material portion in the other of the position in which the mold release sheet member is disposed.

6. The production method according to claim 1, wherein the mold release member comprises a mold release sheet member, and in the curing the resin,
the resin is cured in a state where the mold release sheet member is disposed in one of the first position and the second position, and
when the mold release sheet member is disposed in a first position, the rib material portion contacts the rear-wing-spar material portion.

7. The production method according to claim 1, wherein the mold release member comprises a mold release sheet member, and in the curing the resin,
the resin is cured in a state where the mold release sheet member is disposed in one of the first position and the second position, and
when the mold release sheet member is disposed in a second position, the rib material portion contacts the front-wing-spar material portion.

8. The production method according to claim 1. wherein the mold release member comprises a mold release sheet member, and in the curing the resin,
the resin is cured in a state where the mold release sheet member is disposed in one of the first position and the second position, and
the rib material portion contacts the front-wing-spar material portion or the rear-wing-spar material portion in the other of the first position and the second position in which the mold release sheet member is disposed.

9. The production method according to claim 1, wherein the mold release member comprises a mold release sheet member, further comprising:
removing the mold release sheet member, after the molding the composite material;
inserting a shim in a space from which the mold release sheet member has been removed, after the removing the mold release sheet member; and
fastening the composite material and the shim by a fastening member, after the inserting the shim.

10. The production method according to claim 1, wherein the mold release member comprises a mold release sheet member, the method further comprising:
impregnating the fiber base material with the resin, after the disposing the mold release sheet member and before the curing the resin.

* * * * *